United States Patent
Curry et al.

(10) Patent No.: US 10,287,855 B2
(45) Date of Patent: May 14, 2019

(54) AUTOMATION OF ENERGY INDUSTRY PROCESSES USING STORED STANDARD BEST PRACTICES PROCEDURES

(71) Applicants: David Alexander Curry, London (GB); Dmitriy Dashevskiy, Celle (DE); Roland May, Celle (DE)

(72) Inventors: David Alexander Curry, London (GB); Dmitriy Dashevskiy, Celle (DE); Roland May, Celle (DE)

(73) Assignee: BAKER HUGHES, A GE COMPANY, LLC, Houston, TX (US)

( * ) Notice: Subject to any disclaimer, the term of this patent is extended or adjusted under 35 U.S.C. 154(b) by 224 days.

(21) Appl. No.: 14/925,590

(22) Filed: Oct. 28, 2015

(65) Prior Publication Data
US 2017/0122076 A1     May 4, 2017

(51) Int. Cl.
*E21B 44/00*     (2006.01)
*E21B 41/00*     (2006.01)
(Continued)

(52) U.S. Cl.
CPC .......... *E21B 41/0092* (2013.01); *E21B 44/00* (2013.01); *E21B 44/005* (2013.01);
(Continued)

(58) Field of Classification Search
CPC .............................. E21B 44/00; E21B 44/005
See application file for complete search history.

(56) References Cited

U.S. PATENT DOCUMENTS 6,021,377 A * 2/2000 Dubinsky ............... E21B 7/068
                                                                 702/9
6,968,909 B2   11/2005 Aldred et al.
(Continued)

FOREIGN PATENT DOCUMENTS

WO     2014070823 A2    5/2014

OTHER PUBLICATIONS

Ghazali, et al.; "Intelligent Inspection Processes for Intelligent Maintenance: The Potential of RFID in the Petroleum Industry"; International Journal of Construction Engineering and Management; 2013; Scientific & Academic Publishing; 13 pages.
(Continued)

*Primary Examiner* — Andrew W Bee
(74) *Attorney, Agent, or Firm* — Cantor Colburn LLP

(57) ABSTRACT

An embodiment of a method of performing an energy industry operation includes storing one or more sets of instructions at a storage location accessible by a controller configured to control aspects of an energy industry operation, the one or more sets of instructions retrieved from a library of sets of instructions, each set of instructions prescribing a standard procedure for performing a process forming part of the energy industry operation, the standard procedure based on best operating practices developed from previously performed operations independent of the process to be performed. The method also includes deploying a carrier in a borehole in an earth formation and performing an energy industry operation, monitoring the operation and, in response to detecting a condition associated with the process, automatically retrieving the set of instructions corresponding to the process, and automatically performing the process by the controller according to the retrieved set of instructions.

18 Claims, 3 Drawing Sheets

(51) Int. Cl.
    *E21B 47/00*    (2012.01)
    *E21B 47/12*    (2012.01)
    *G05B 13/02*    (2006.01)
(52) U.S. Cl.
    CPC .............. *E21B 47/00* (2013.01); *E21B 47/12* (2013.01); *G05B 13/021* (2013.01)

(56)  References Cited

U.S. PATENT DOCUMENTS

| | | | |
|---|---|---|---|
| 2003/0168257 A1* | 9/2003 | Aldred | E21B 44/00 175/24 |
| 2004/0256152 A1* | 12/2004 | Dashevskiy | E21B 44/00 175/25 |
| 2009/0132458 A1 | 5/2009 | Edwards et al. | |
| 2012/0059521 A1 | 3/2012 | Iversen et al. | |
| 2014/0353033 A1 | 12/2014 | Pink et al. | |
| 2015/0014058 A1 | 1/2015 | Wassell et al. | |
| 2015/0112949 A1 | 4/2015 | Marland | |

OTHER PUBLICATIONS

Notification of Transmittal of the International Search Report and the Written Opinion of the International Searching Authority, or the Declaration; PCT/2016/059083; dated Feb. 8, 2017; 14 pages.

\* cited by examiner

US 10,287,855 B2

AUTOMATION OF ENERGY INDUSTRY PROCESSES USING STORED STANDARD BEST PRACTICES PROCEDURES

BACKGROUND

Various operations are performed by the energy industry to evaluate earth formations and produce hydrocarbons. Such operations include drilling, stimulation and production. Operations can involve many different steps, which should be implemented according to carefully developed processes to ensure effective and efficient hydrocarbon production. For example, "best" operating practices and procedures have been developed by the industry for use in implementing energy industry operations to improve performance. Timely and consistent implementation of best operating practices is important in the attainment of good operational performance.

BRIEF SUMMARY

An embodiment of a method of performing an energy industry operation includes storing one or more sets of instructions at a storage location accessible by a controller configured to control aspects of an energy industry operation, the one or more sets of instructions retrieved from a library of sets of instructions, each set of instructions prescribing a standard procedure for performing a process forming part of the energy industry operation, the standard procedure based on best operating practices developed from previously performed operations independent of the process to be performed. The method also includes deploying a carrier in a borehole in an earth formation and performing an energy industry operation, monitoring the operation and, in response to detecting a condition associated with the process, automatically retrieving the set of instructions corresponding to the process, and automatically performing the process by the controller according to the retrieved set of instructions.

An embodiment of a system for performing an energy industry operation includes a procedure management unit configured to store one or more sets of instructions, each set of instructions prescribing a standard procedure for performing a process forming part of an energy industry operation, the standard procedure based on best operating practices developed from previously performed operations independent of the process to be performed. The system also includes a controller in operable communication with the procedure management unit, the controller configured to control aspects of an energy industry operation. The controller is configured to perform controlling operational parameters of the energy industry operation via a carrier deployed in a borehole in an earth formation, retrieving a set of instructions from the procedure management unit in response to a command from a user during the energy industry operation, the command selecting the set of instructions, the set of instructions selected based on at least one of a phase of the operation and a condition detected during the operation, and automatically adjusting the operational parameters according to the selected set of instructions.

An embodiment of a computer program product includes a computer readable storage medium having program instructions embodied therewith, the program instructions executable by a processing device to cause the processing device to perform a method. The method includes storing one or more sets of instructions at a storage location accessible by a controller configured to control aspects of an energy industry operation, the one or more sets of instructions retrieved from a library of sets of instructions, each set of instructions prescribing a standard procedure for performing a process forming part of the energy industry operation, the standard procedure based on best operating practices developed from previously performed operations independent of the process to be performed. The method also includes deploying a carrier in a borehole in an earth formation and performing an energy industry operation, monitoring the operation and, in response to detecting a condition associated with the process, automatically retrieving the set of instructions corresponding to the process, and automatically performing the process by the controller according to the retrieved set of instructions.

BRIEF DESCRIPTION OF THE DRAWINGS

The following descriptions should not be considered limiting in any way. With reference to the accompanying drawings, like elements are numbered alike.

DETAILED DESCRIPTION

Systems and methods are described herein for facilitating and/or performing energy industry operations based on best practices information. An embodiment of a method includes accessing a library or store of generic or standard best practices or procedures based on best practices in preparation for and/or during an energy industry operation. An embodiment of a system includes a processor or controller configured to retrieve one or more standard sequences or sets of instructions that have been pre-generated based on industry accepted best practices. The sets of instructions may be embodied in the form of algorithms or sequences of operations (e.g., rules), and are used by a controller (e.g., a human user and/or control device) to perform processes involved in energy industry operations. Another embodiment of a system includes a processing device or system, referred to as a procedure management unit, which maintains a library of sets of instructions generated according to standard best practices.

Embodiments described herein provide a quick and effective way to automatically perform aspects of an operation by retrieving a standard sequence without requiring the use of a model of a specific formation or needing to perform other potentially arduous processing tasks. Procedures such as breaking in a drill bit and reaming can be controlled using the standard sequence. Processes can be performed by following the standard sequence, or the standard sequence can be modified as desired based on specific operating conditions and parameters.

Figure 1:
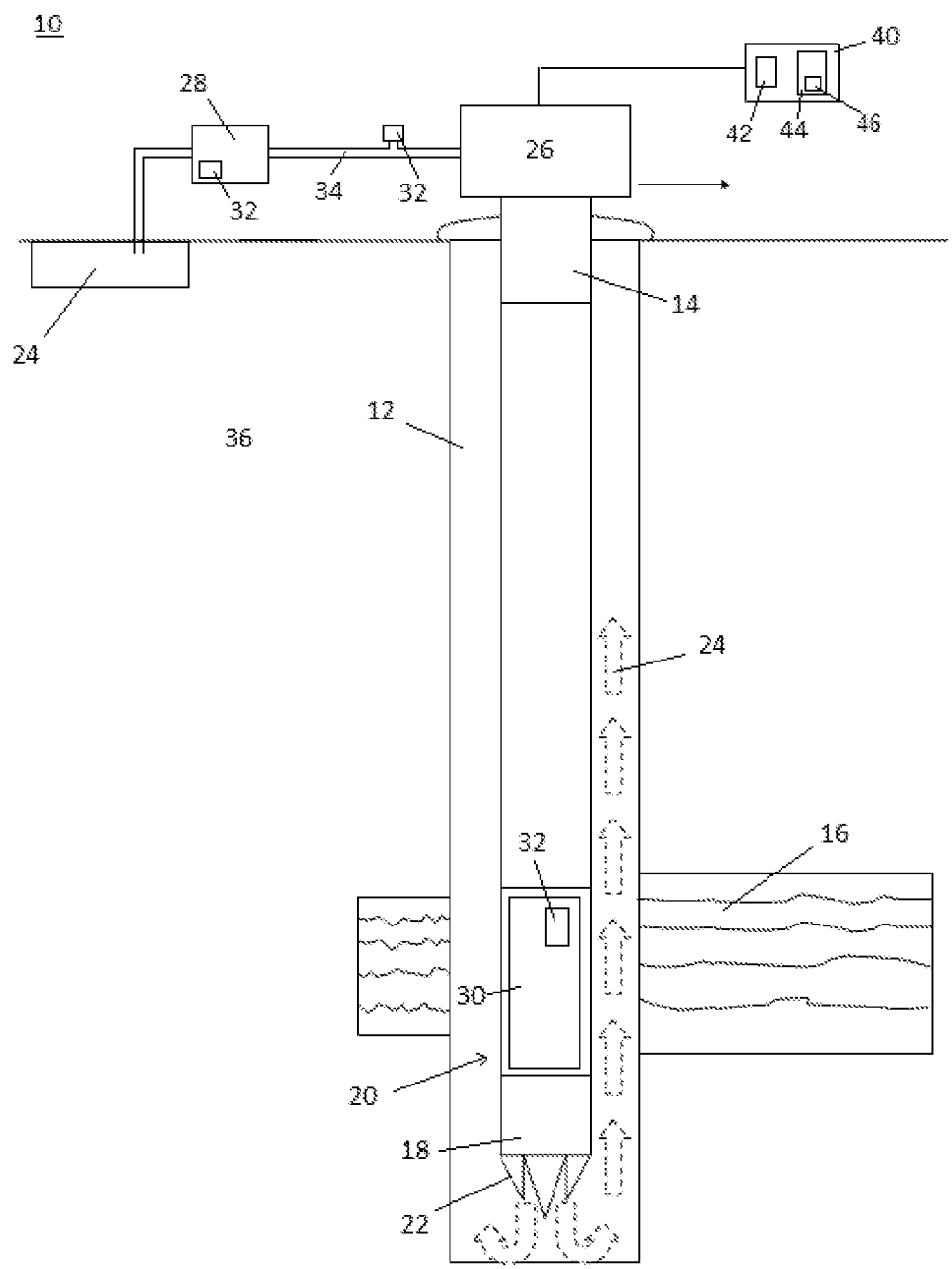
FIG. 1 depicts an embodiment of a well logging, production and/or drilling system.

FIG. 1 illustrates an example of a system 10 that can be used to perform one or more energy industry operations, and retrieve and utilize procedural information described herein. The system 10 in this example is a well logging, production and/or drilling system that includes a borehole string, shown in this embodiment as a drill string 14, disposed in a borehole 12 that penetrates at least one earth formation 16. Although the borehole 12 is shown in FIG. 1 to be of constant diameter, the borehole is not so limited. For example, the borehole 12 may be of varying diameter and/or direction (e.g., azimuth and inclination). The drill string 14 is made from, for example, a pipe, multiple pipe sections or coiled tubing. The system 10 and/or the drill string 14 includes various downhole components or assemblies, such as a drilling assembly 18 (including, e.g., a drill bit and mud motor) and various measurement tools and communication assemblies, one or more of which may be configured as a bottomhole assembly (BHA) 20. The various measurement tools may be included for performing measurement regimes such as wireline measurement applications, logging-while-drilling (LWD) applications and measurement-while-drilling (MWD) applications. Sensors may be disposed at one or multiple locations along a borehole string, e.g., as distributed sensors in a drill string, wireline or other component.

In this embodiment, the drill string 14 drives a drill bit 22 that penetrates the formation 16. Downhole drilling fluid 24, such as drilling mud, is pumped through a surface assembly 26 (including, e.g., a derrick, rotary table or top drive, and/or standpipe) into the drill string 14 using one or more pumps 28, and returns to the surface through the borehole 12. Drill bit rotation may be accomplished, for example, by a top drive or other surface rotation configuration, or by a downhole motor or turbine. The system 10 is not limited to the particular drilling and pumping configuration shown in FIG. 1, and may be any suitable configuration. For example, the system 10 may be configured to employ flow configurations such as mud return and/or reverse circulation configurations. In other examples, the system is configured for offshore use, and may be configured as a system that includes risers, a riserless configuration, and/or a configuration that returns fluid and materials to a seabed.

The system 10 (or components thereof) may be used to perform various energy industry operations, such as drilling, measurement, stimulation and/or production operations. For example, the system 10 is used to drill boreholes (i.e., wells) in the formation, and may include one or more measurement assemblies such as a logging-while-drilling (LWD) tool 30. Other types of operations may also be performed, such as production and stimulation operations that include pumping fluid into and/or from the borehole 12 to facilitate production of hydrocarbons from a formation and/or hydraulically stimulate or fracture a formation. Exemplary logging tools include devices implementing resistivity, nuclear magnetic resonance, acoustic, seismic and other such technologies.

Various sensors may be disposed at or deployed with the system 10 for controlling and monitoring aspects of an operation. For example, sensors 32 are disposed at the pump 28, at a fluid line 34 and/or downhole for measuring properties of fluids (e.g., pressure, temperature and/or flow rate). Various other types of sensors may be included as needed, such as strain sensors, temperature sensors. Examples of devices that can be used to perform measurements include pulsed neutron tools, gamma ray measurement tools, neutron tools, resistivity tools, acoustic tools, nuclear magnetic resonance tools, density measurement tools, seismic data acquisition tools, acoustic impedance tools, formation pressure testing tools, fluid sampling and analysis tools, coring tools and/or any other type of sensor or device capable of providing information regarding a formation, borehole and/or operation.

A processing unit 40 is connected in operable communication with components of the system 10 and may be located, for example, at a surface location. The processing unit 40 may also be incorporated with the drill string 14 or the BHA 20, or otherwise disposed downhole as desired. Components of the drill string or other borehole string may be connected to the processing unit 40 via any suitable communication regime, such as mud pulse telemetry, wired links (e.g., hard wired drill pipe or coiled tubing), wireless links, optical links or others. The processing unit 40 may be configured to perform functions such as controlling drilling and steering, transmitting and receiving data, processing measurement data and/or monitoring operations. The processing unit 40, in one embodiment, includes a processor 42 and a data storage device (or a computer-readable medium) 44 for storing, data, models and/or computer programs or software 46.

In one embodiment, the processing unit 40 is configured to control aspects of an operation using standardized best practices procedures. For example, the processing unit 40 is in communication with a storage and/or processing device, referred to as a procedure management unit, and can access or request one or more standard procedures based on the type of operation, the particular step or portion of the operation, data from previous wells or wells in similar formations, and other criteria such as equipment setup and operational parameters. In one embodiment, the processing unit 40 may retrieve one or more standard procedures from a library or collection of standard procedures. Upon retrieval of a set of instructions describing the procedure, the processing unit 40 may provide the procedure to a user or automatically perform operational steps according to the procedure. As discussed further below, the processing unit 40 may also modify or tailor the procedure to a specific operational portion or step as needed.

Figure 2:
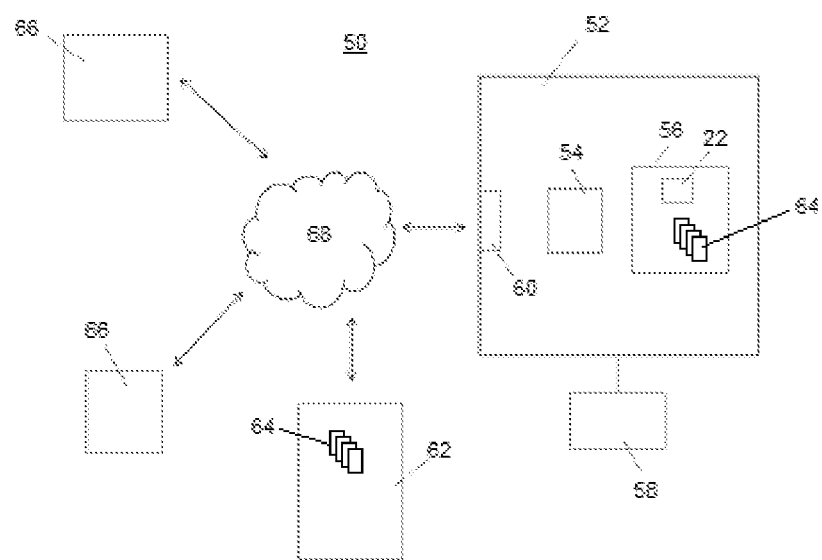
FIG. 2 depicts an embodiment of a data processing, storage and procedure management system.
Figure 3:
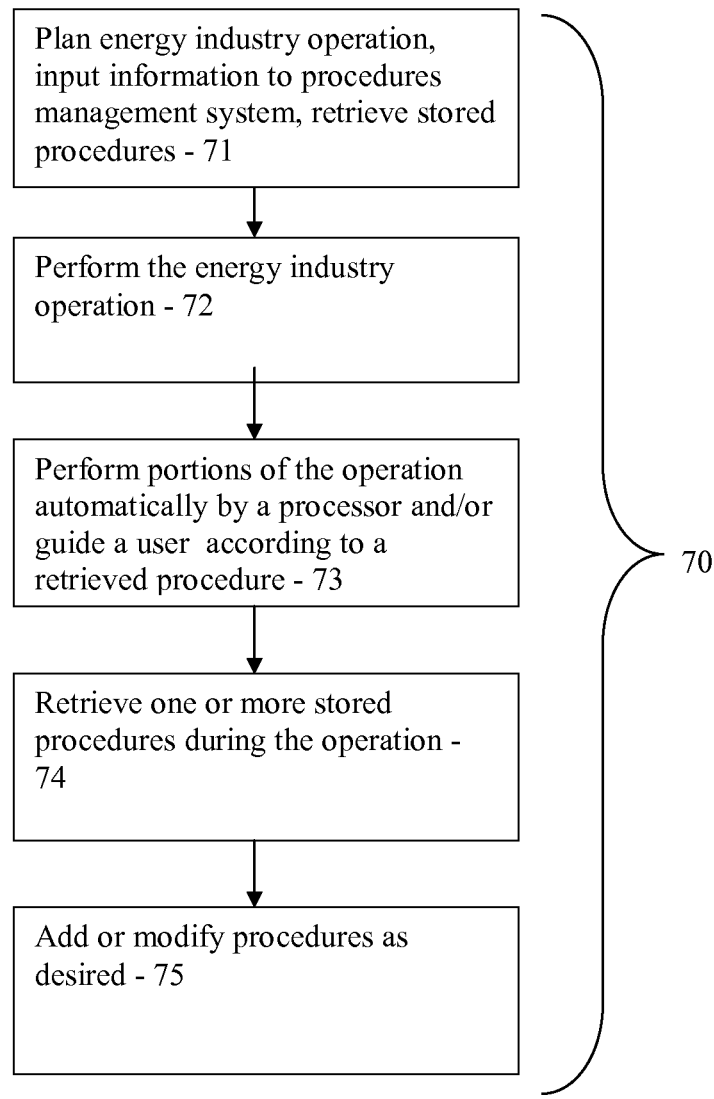
FIG. 3 is a flow chart providing an exemplary method of performing aspects of an energy industry operation.

FIG. 2 illustrates an embodiment of a data collection, processing and/or analysis system 50, which can be used to perform aspects of storing and providing standard procedures according to embodiments described herein. The system 50 includes a procedure management unit 52, which is a processing device or system such as a computer (e.g., desktop or laptop PC, smartphone, tablet, etc.), which includes suitable display and interface components to allow a user to input data for storage and retrieval of procedural data. For example, the procedure management 52 includes a processor 54, memory 56, a display unit 58 and input/output interface(s) 60. The memory 56 stores input data and programs or instructions for executing various processing operations, such as analysis of input data, retrieval of procedures and/or modification of procedures based on input data.

The procedure management unit 52 is connected to various data storage locations, which may be internal or external to the procedure management unit 52. For example, the procedure management unit 52 is connected to one or more best practices procedure databases 62 that store procedural information that can be used by systems to control aspects of operations. For example, the procedure management unit 52 and/or database 62 stores a library of standardized sets of instructions 64 corresponding to best practices for performance of various types of processes that may be part of an energy industry operation or may arise during an operation. A "library" as described herein refers to any collection of data that stores individual procedures or sets of instructions, and is not limited to any particular format or configuration. The sets of instructions 64 may be stored as individual procedure files or in any suitable file format or other data structure.

The procedure management unit 52 is connected to one or more users 66 (human or device) via, e.g., a network 68 such as the internet, a local area network or wide area network. The users may be, for example, rig operators, processing devices, control systems and any other device or user that can receive procedural information and control aspects of an energy industry operation. An exemplary user is the processing unit 40 of the system 10.

In one embodiment, the procedure management unit 52 is (or is at least part of) a host system, and the users 66 are clients. For example, the processing unit 52 is a host server, mainframe or other device, and the users are clients such as computers, laptops, mobile devices and others.

The processing unit 52 maintains a library of best practices procedures that are standardized. A "standardized" procedure is a procedure that is applicable to multiple users and includes steps that are followed in executing a type of process, and are common to the process irrespective of particular variations in conditions or parameters. The standardized procedures are not specific to any one operation or formation, but are generalized to be applicable to any operation that shares common aspects or steps. The procedure management unit 52 provides the procedures to users so that best practices can be timely and consistently implemented, to obtain good drilling and other operation performance.

In one embodiment, the sets of instructions are generated or created based on industry accepted best practices relating to various processes associated with energy industry operations. Such processes may be procedural and repetitive during an operation, e.g., during drilling of a borehole. Exemplary processes include breaking in a drill bit and reaming.

For example, the procedure management unit 52 and/or database 62 stores a library of documented good drilling practices. Some of the practices set out procedures to follow in order to achieve most effectively and efficiently a particular drilling task, and others set out procedures to follow in order to mitigate or to eliminate specific drilling problems such as stick-slip motion of a drill string, whirling motion of a drill bit, and others. The practices may be made available to users as sets of instructions representing standard default sets of best drilling practices. The practices may also be customized to an individual user or a well or set of wells being drilled.

Although the steps prescribed by a particular set of instructions are not specific to an individual well, operation or operator/user, the set of instructions may be specific to a type of well, operation or other circumstance. A set of instructions may be particular to a certain type of equipment, such as a type of drill bit or BHA. For example, a set of instructions provides best practices (e.g., type and location of stabilizer, type of drill bit, operational parameters during drilling, etc.) for controlling vibration when drilling. The instructions may be different depending on the type of equipment or drilling operation. A set of instructions may thus be stored for drilling with a downhole motor (motor BHA), and a modified set of instructions may be stored for drilling with a rotary BHA, as different equipment is used depending on which type of BHA is used. Although the sets of instructions are thus customized based on certain equipment, operation types and other conditions, each set of instructions is not specific to the exact operation being performed and thus is applicable to multiple users, locations and/or operations.

The set of instructions may include operating parameter command values that change as appropriate to the process or problem being addressed. For example, one or more parameters prescribed by the instructions may change as a function of time and/or depth. In addition, the one or more parameters may change in response to measurements of parameters relevant to the process or the task or problem being addressed, and/or in response to detected changes in conditions.

In one embodiment, the procedure management unit 52 is configured to automatically issue standardized procedures to a device or user to facilitate performing energy industry operations. In response to a request or appropriate inputs, the procedure management unit 52 selects a standardized procedure to be followed by, e.g., a drilling rig or energy industry system control device. The standardized procedure may be a set of instructions or any other set of data describing operating steps to be performed to accomplish an aspect or portion of an energy industry operation. The set of data may be an algorithm, a set of instructions, a textual or other visual display describing the operating steps, or any other type of data structure that can be used by an operator and/or control device to perform the procedure.

In one embodiment, the set of instructions is generated or adjusted based on specific conditions under which the best practice is being implemented. For example, the desired weight on bit at any stage in a bit break in process is determined by the bit type, the bit diameter, and the properties of the formation being drilled, and may also be influenced by other factors such as BHA composition and drilling fluid properties. A specific best practice may be repeated, or should be repeated, many times during the drilling of one well, or may be needed in circumstances which only arise infrequently. In all instances, however, the procedure that the set of instructions lays out should be followed if good drilling performance is to be achieved.

FIG. 5 illustrates a method 70 of performing aspects of an energy industry operation. The method 70 is used in conjunction with the system 10 and/or the system 40, although the method 70 may be utilized in conjunction with any suitable combination of processors and networks. The method 70 includes one or more stages 71-75. In one embodiment, the method 70 includes the execution of all of stages 71-75 in the order described. However, certain stages may be omitted, stages may be added, or the order of the stages changed.

In the first stage 71, an energy industry operation, such as a drilling operation, is planned. The planning may include selecting appropriate types of equipment and determining operational parameters. For example, in planning a drilling operation, the type of drill bit and BHA is selected, and operational parameters such as borehole trajectory, pumping speed, weight-on-bit (WOB) and time parameters are selected.

As part of the planning, a user or control device (e.g., the surface processing unit 40) accesses a library of sets of instructions representing standard procedures that can be used to perform portions of the operation. For example, the user inputs data that describes aspects of the operation to a storage and processing device, such as the procedure management unit 52. Based on these inputs, the procedure management unit 52 selects one or more standard sets of instructions that can be used to perform portions of the operation.

Exemplary processes that can be performed as portions of the operation include breaking in a new drill bit, tripping in or out of a borehole, running casing into a borehole, pumping cement, drilling out a shoe track following the cementing of casing and any other processes that would benefit from following best practices.

In one embodiment, the procedure management unit 52 adjusts or modifies the set of instructions to customize the procedure to the specific operation being performed. For example, a user inputs information such as formation properties and bit type, and the procedure management unit 52 adjusts aspects of the procedure, such as WOB, rate of penetration, drill bit rotational speed and others. Other information may be input, such as hole geometry information and/or performance parameters (e.g., rate of penetration) measured for earlier portions of the same well and/or from other wells.

In the second stage 72, a borehole string such as the drill string 14 is disposed in the borehole, and a downhole operation is performed. Exemplary operations include drilling operations, LWD operations, wireline operations, completion operations, stimulation operations and others. Drilling mud and/or other fluids are circulated through the borehole 12 using one or more pumps 28.

In the third stage 73, various processes are performed as part of the operation. In one embodiment, the surface processing unit 40 automatically controls the one or more processes following the steps prescribed by a corresponding set of instructions. In another embodiment, all or part of the process is performed by a user.

Some best practices may involve comparing currently measured process data with limits, which may be generic values or may themselves have been input by a user on the basis of either planned operating parameters or experience from the current well or from previous wells. In such instances, the surface processing unit 40 and/or other processor or controller automatically receives measurement data and compares such data to associated limits or thresholds. Operational parameters may be changed or adjusted by the surface processing unit 40 as prescribed by the set of instructions in response to measured data exceeding a limit.

During performance of the operation, in one embodiment, information gained during the operation is used to update the steps of the set of instructions. For example, the set of instructions may be modified or adjusted by a processor or by a human user based on experience or knowledge gained while performing the process. The operation is continued and operational parameters changed where appropriate to conform to the updated set of instructions.

In the fourth stage 74, in response to a certain condition or user input, the procedure management unit 52 retrieves one or more sets of instructions during the operation to address potential changes in the operation, or problems or unexpected conditions that arise during the operation. A condition is any set of circumstances arising during the operation that would prompt performance or execution of a certain process or procedure. Conditions may include detected downhole or surface conditions (e.g., temperature, pressure, vibration, etc.) that indicate that a new phase of an operation should be performed. Other conditions may include pre-determined time periods at which a procedure should be performed.

For example, the operation is monitored using various sensors such as pressure, flow rate, strain, vibration and/or temperature sensors. Downhole conditions are monitored, and the procedure management unit 52 and/or processing unit 40 perform an action in response to detecting that a downhole condition has changed (or will change) or that a problem or condition is occurring or is impending that requires attention. Downhole conditions that could trigger such action include, for example, a change in formation properties encountered during drilling, a stick-slip condition, a potential blowout or excessive pressure condition or any other condition that could pose a problem, reduce operational effectiveness or cause damage to the borehole or equipment. Other conditions may include a critical situation such as the first use of a new drill bit, when implementation of the appropriate best practice would avoid negative consequences which would follow were the appropriate best drilling practice not implemented.

In one embodiment, the action includes automatically selecting a stored procedure (from the surface processing unit controlling the operation or a management unit) and controlling parameters of the operation. In another embodiment, the processing unit alerts an operator or controller to the change or problem.

For example, in response to detecting a condition (e.g., a problem or critical situation) that should be addressed, the procedure management unit 52 and/or processing unit 40 alerts an operator to the problem or the critical situation. The procedure management unit 52 and/or processing unit 40 may also offer to implement (immediately or after a selected period of time) an automated best practice according to an appropriate set of instructions. The extent to which the operator would be able to influence the implementation of the automated best practice could depend on the severity of the problem or situation and the potential severity of the negative consequences of not implementing the best practice. In the case of minor problems or limited negative consequences, the operator could be alerted to the problem or situation and given the option of implementing the suggested automated best practice if they wished. For more serious problems or situations, the operator could be alerted and given a short period in which to decline the automated best practice, after which period the best practice would be implemented unless the operator specifically declined it. And for the most serious problems or situations, the automated best practice would be immediately and automatically implemented by the procedure management unit 52 and/or processing unit 40.

For example, if the processing unit 40 detects vibrations consistent with a stick-slip condition, a stored set of instructions that prescribes a procedure for alleviating this condition is selected from data stored by the processing unit 40 or retrieved from the procedure management unit 52. The procedure may be a standard procedure, or a standard procedure that is modified according to the specific operation or detected conditions. The processing unit 40 may then automatically adjust operational parameters according to the procedure to address the stick-slip condition and/or alert an operator.

In the fifth stage 75, at any point before, during or after the operation, new procedures or sets of instructions may be added to the library. For example, procedures could be added or updated in response to new best practices being developed. In another example, a user can add procedures specific to a user, formation or operation.

In one embodiment, the procedure management unit 52 and/or processing unit 40 is configured to detect and address any potential or actual conflicts that may arise during the operation. Such conflicts can arise, e.g., if a normally recommendable operating parameter lies outside that specific rig's and/or specific well's safe working envelope. A conflict can also arise if more than one problem or critical situation has been detected and the best drilling practice recommended in response to one problem or critical situation would involve implementing an operation or operating parameter which is in conflict with the best drilling practice recommended in response to another one of the detected problems or critical situations.

The procedure management unit 52 and/or processing unit 40 can manage conflicting processes or operating parameter recommendations on the basis of identifying the risk of damage, failure or sub-optimal performance associated with each process and/or associated with a condition associated with the process. For example, each set of instructions configured to address a condition occurring or impending during an energy industry operation as assigned a severity level according to the risk posed by the condition. When the procedure management unit 52 and/or processing unit 40 receives input data describing more than one condition, sets of instructions associated with each condition as prioritized according to their severity levels. This allows for reducing or minimizing the risk by prioritizing the recommendation which addresses the problem or critical situation previously identified as posing the greatest risk. The identification of problems or critical situations and the ranking of their associated risks could be undertaken as part of a pre-well hazard and risk assessment specific to the well to be drilled. In the event that such a well specific hazard and risk assessment were not available, then a generic ranking of risks associated with commonly identified problems and critical situations could be developed by subject matter experts and made available to users of the system as a fall-back option.

Conflicting processes and conditions may be managed by issuing to a controller (e.g., a rig control system) a set of instructions that includes recommended operational parameters that address a particular condition and that also includes constraints configured to avoid other potentially detrimental conditions. For example, an increase in weight on bit recommended in a set of instructions includes a recommended limit or range that should be adhered to in order to avoid or mitigate other conditions such as bit induced whirling vibration. There will also be upper limits to the tolerable torque in order to avoid stick-slip vibration and in order to avoid damage to a drill string. The recommended weight on bit may also include limits to avoid triggering a more serious problem than the one that weight on bit is intended to control. In another example, the speed at which pipe enters the well should exceed neither the surge-pressure related nor the reaming related maximum allowable speed.

One or more aspects of the embodiments described herein can be included in an article of manufacture (e.g., one or more computer program products) having, for instance, computer usable media. The media has therein, for instance, computer readable instructions, program code means or logic (e.g., code, commands, etc.) to provide and facilitate the capabilities of the present invention. The article of manufacture can be included as a part of a computer system or provided separately. These instructions may provide for equipment operation, control, data collection and analysis and other functions deemed relevant by a system designer, owner, user or other such personnel, in addition to the functions described in this disclosure.

The methods and systems described herein provide various advantages over prior art techniques. The embodiments described herein provide for effective management and implementation of procedures based on standard best operating practices, on demand or in response to system detected situations or events. Implementation of best practices can be automatically and/or quickly performed or recommended to ensure their timely and consistent implementation.

The embodiments described herein can be employed to ensure that best practices are followed and avoid the failure to follow best practices. Factors such as inexperience and human error can result in failure to fully implement best practices. The failure to follow best operating practices can lead to sub-optimal performance, through for instance inefficient rock destruction, incomplete hole cleaning, unnecessary damage to one or more components of a drilling system and/or rig, avoidable non-productive time, difficulty performing subsequent well construction operations, failure to collect desired formation evaluation measurements, loss of well control, failing to meet objectives, and/or catastrophic conditions such as a blow out or complete loss of the well or rig. The embodiments help to prevent or avoid such conditions by ensuring that best practices are automatically performed and/or guiding operators to ensure that they follow best practices.

Set forth below are some embodiments of the foregoing disclosure:

Embodiment 1: A method of performing an energy industry operation, the method comprising: storing one or more sets of instructions at a storage location accessible by a controller configured to control aspects of an energy industry operation, the one or more sets of instructions retrieved from a library of sets of instructions, each set of instructions prescribing a standard procedure for performing a process forming part of the energy industry operation, the standard procedure based on best operating practices developed from previously performed operations independent of the process to be performed; deploying a carrier in a borehole in an earth formation and performing an energy industry operation; monitoring the operation and, in response to detecting a condition associated with the process, automatically retrieving the set of instructions corresponding to the process; and automatically performing the process by the controller according to the retrieved set of instructions.

Embodiment 2: The method of embodiment 1 wherein performing the process includes automatically controlling parameters of the process according to the set of instructions.

Embodiment 3: The method of embodiment 1 wherein performing the process includes displaying the set of instructions to a human operator as a set of actions to be performed by the operator.

Embodiment 4: The method of embodiment 1 wherein the processor is a host processing unit communicatively connected to a controller configured to control or monitor at least part of the process, and performing the process includes transmitting the set of instructions to the controller.

Embodiment 5: The method of embodiment 4 wherein the host processing unit is communicatively connected to a plurality of different controllers and is configured to retrieve standard procedures for a plurality of types of energy industry processes.

Embodiment 6: The method of embodiment 1 further comprising, after retrieving the set of instructions, adjusting the set of instructions to customize the set of instructions to one or more parameters specific to the process.

Embodiment 7: The method of embodiment 1 wherein the input data includes at least one of: information describing parameters of a planned energy industry operation, and measurement data collected in real time during the energy industry operation.

Embodiment 8: The method of embodiment 7 wherein the processor is configured to identify a potentially detrimental condition that is occurring or impending during the energy industry operation, and retrieving the set of instructions includes automatically selecting a set of instructions best suited to address the condition and performing at least one of transmitting in real time the set of instructions to a user and executing the set of instructions automatically by the processor or another processor.

Embodiment 9: The method of embodiment 1 further comprising updating the set of instructions and corresponding best operating practices based on experience or knowledge gained while performing the process.

Embodiment 10: A system for performing an energy industry operation, the system comprising: a procedure management unit configured to store one or more sets of instructions, each set of instructions prescribing a standard procedure for performing a process forming part of an energy industry operation, the standard procedure based on best operating practices developed from previously performed operations independent of the process to be performed; and a controller in operable communication with the procedure management unit, the controller configured to control aspects of the energy industry operation, the controller configured to perform: controlling operational parameters of the energy industry operation via a carrier deployed in a borehole in an earth formation; retrieving a set of instructions from the procedure management unit in response to a command from a user during the energy industry operation, the command selecting the set of instructions, the set of instructions selected based on at least one of a phase of the operation and a condition detected during the operation; and automatically adjusting the operational parameters according to the selected set of instructions.

Embodiment 11: A computer program product comprising a computer readable storage medium having program instructions embodied therewith, the program instructions executable by a processing device to cause the processing device to perform a method comprising: storing one or more sets of instructions at a storage location accessible by a controller configured to control aspects of an energy industry operation, the one or more sets of instructions retrieved from a library of sets of instructions, each set of instructions prescribing a standard procedure for performing a process forming part of the energy industry operation, the standard procedure based on best operating practices developed from previously performed operations independent of the process to be performed; deploying a carrier in a borehole in an earth formation and performing an energy industry operation; monitoring the operation and, in response to detecting a condition associated with the process, automatically retrieving the set of instructions corresponding to the process; and automatically performing the process by the controller according to the retrieved set of instructions.

Embodiment 12: The computer program product of embodiment 11 wherein performing the process includes automatically controlling parameters of the process according to the set of instructions.

Embodiment 13: The computer program product of embodiment 11 wherein performing the process includes displaying the set of instructions to a human operator as a set of actions to be performed by the operator.

Embodiment 14: The computer program product of embodiment 11 wherein the processing device is a host processing unit communicatively connected to a controller configured to control or monitor at least part of the process, and performing the process includes transmitting the set of instructions to the controller.

Embodiment 15: The computer program product of embodiment 14 wherein the host processing unit is communicatively connected to a plurality of different controllers and is configured to retrieve standard procedures for a plurality of types of energy industry processes.

Embodiment 16: The computer program product of embodiment 11 wherein the method further comprises, after retrieving the set of instructions, adjusting the set of instructions to customize the set of instructions to one or more parameters specific to the process.

Embodiment 17: The computer program product of embodiment 11 wherein the input data includes at least one of: information describing parameters of a planned energy industry operation, and measurement data collected in real time during the energy industry operation.

Embodiment 18: The computer program product of embodiment 17 wherein the processing device is configured to identify a potentially detrimental condition that is occurring or impending during the energy industry operation, and retrieving the set of instructions includes automatically selecting a set of instructions best suited to address the condition and transmitting in real time the set of instructions to a user.

Embodiment 19: The computer program product of embodiment 11 wherein the process is to be performed repetitively during the energy industry operation.

Embodiment 20: The computer program product of embodiment 11 wherein the set of instructions includes a severity level value assigned thereto, and retrieving the set of instructions includes identifying at least two sets of instructions associated with different standard procedures applicable to the process, and determining which set of instructions has a higher priority based on the severity level.

In support of the teachings herein, various analyses and/or analytical components may be used, including digital and/or analog systems. The system may have components such as a processor, storage media, memory, input, output, communications link (wired, wireless, pulsed mud, optical or other), user interfaces, software programs, signal processors (digital or analog) and other such components (such as resistors, capacitors, inductors and others) to provide for operation and analyses of the apparatus and methods disclosed herein in any of several manners well-appreciated in the art. One skilled in the art will recognize that the various components or technologies may provide certain necessary or beneficial functionality or features. Accordingly, these functions and features as may be needed in support of the appended claims and variations thereof, are recognized as being inherently included as a part of the teachings herein and a part of the invention disclosed.

The use of the terms "a" and "an" and "the" and similar referents in the context of describing the invention (especially in the context of the following claims) are to be construed to cover both the singular and the plural, unless otherwise indicated herein or clearly contradicted by context. Further, it should further be noted that the terms "first," "second," and the like herein do not denote any order, quantity, or importance, but rather are used to distinguish one element from another. The modifier "about" used in connection with a quantity is inclusive of the stated value and has the meaning dictated by the context (e.g., it includes the degree of error associated with measurement of the particular quantity).

The teachings of the present disclosure may be used in a variety of well operations. These operations may involve using one or more treatment agents to treat a formation, the fluids resident in a formation, a wellbore, and/or equipment in the wellbore, such as production tubing. The treatment agents may be in the form of liquids, gases, solids, semi-solids, and mixtures thereof. Illustrative treatment agents include, but are not limited to, fracturing fluids, acids, steam, water, brine, anti-corrosion agents, cement, permeability modifiers, drilling muds, emulsifiers, demulsifiers, tracers, flow improvers etc. Illustrative well operations include, but are not limited to, hydraulic fracturing, stimulation, tracer injection, cleaning, acidizing, steam injection, water flooding, cementing, etc.

While the invention has been described with reference to an exemplary embodiment or embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the claims. Also, in the drawings and the description, there have been disclosed exemplary embodiments of the invention and, although specific terms may have been employed, they are unless otherwise stated used in a generic and descriptive sense only and not for purposes of limitation, the scope of the invention therefore not being so limited.

The invention claimed is:

1. A method of performing an energy industry operation, the method comprising:
   storing one or more sets of instructions at a storage location accessible by a controller configured to control aspects of the energy industry operation, the one or more sets of instructions retrieved from a library of sets of instructions, each set of instructions prescribing a standard procedure for performing a process forming part of the energy industry operation, the standard procedure based on best operating practices developed from previously performed operations independent of the process to be performed;
   deploying a carrier in a borehole in an earth formation and performing the energy industry operation;
   monitoring the operation and, in response to detecting a condition associated with the process, automatically retrieving the set of instructions corresponding to the process, with the controller;
   automatically controlling and performing, with the controller, the process according to the retrieved set of instructions, wherein parameters of the process are controlled in accordance with the set of instructions;
   automatically determining, with the controller, if a conflict exists with respect to the automatically controlled and performed process; and
   managing a determined conflicting process or conflicting parameter recommendation of the automatically controlled and performed process, with the controller, by identifying a risk of damage, failure, or sub-optimal performance of performed process as associated with at least one of the earth formation, a rig configuration, and the borehole.

2. The method of claim 1, wherein performing the process includes displaying the set of instructions to a human operator as a set of actions to be performed by the operator.

3. The method of claim 1, wherein a host processing unit is communicatively connected to the controller configured to control or monitor at least part of the process, and performing the process includes transmitting the set of instructions to the controller.

4. The method of claim 3, wherein the host processing unit is communicatively connected to a plurality of different controllers and is configured to retrieve standard procedures for a plurality of types of energy industry processes.

5. The method of claim 1, further comprising, after retrieving the set of instructions, adjusting the set of instructions to customize the set of instructions to one or more parameters specific to the process.

6. The method of claim 1, wherein the one or more sets of instructions includes at least one of: information describing parameters of a planned energy industry operation, and measurement data collected in real time during the energy industry operation.

7. The method of claim 6, further comprising identifying a potentially detrimental condition that is occurring or impending during the energy industry operation, and retrieving the set of instructions includes automatically selecting a set of instructions best suited to address the condition and performing at least one of transmitting in real time the set of instructions to a user and executing the set of instructions automatically by the processor or another processor.

8. The method of claim 1, further comprising updating the set of instructions and corresponding best operating practices based on experience or knowledge gained while performing the process.

9. A system for performing an energy industry operation, the system comprising:
   a procedure management unit configured to store one or more sets of instructions, each set of instructions prescribing a standard procedure for performing a process forming part of the energy industry operation, the standard procedure based on best operating practices developed from previously performed operations independent of the process to be performed; and
   a controller in operable communication with the procedure management unit, the controller configured to control aspects of the energy industry operation, the controller configured to perform:
   controlling operational parameters of the energy industry operation via a carrier deployed in a borehole in an earth formation;
   retrieving a set of instructions from the procedure management unit in response to a command from a user during the energy industry operation, the command selecting the set of instructions, the set of instructions selected based on at least one of a phase of the operation and a condition detected during the operation;
   automatically adjusting the operational parameters according to the selected set of instructions;
   automatically determining if a conflict exists with respect to the automatically controlled and performed process; and
   managing a determined conflicting process or conflicting parameter recommendation of the automatically controlled and performed process by identifying a risk of damage, failure, or sub-optimal performance of performed process as associated with at least one of the earth formation, a rig configuration, and the borehole.

10. A computer program product comprising a non-transitory computer readable storage medium having program instructions embodied therewith, the program instructions executable by a processing device to cause the processing device to perform a method comprising:
   storing one or more sets of instructions at a storage location accessible by a controller configured to control aspects of an energy industry operation, the one or more sets of instructions retrieved from a library of sets of instructions, each set of instructions prescribing a standard procedure for performing a process forming part of the energy industry operation, the standard procedure based on best operating practices developed from previously performed operations independent of the process to be performed;

deploying a carrier in a borehole in an earth formation and performing the energy industry operation;

monitoring the operation with the controller and, in response to detecting a condition associated with the process, automatically retrieving the set of instructions corresponding to the process with the controller; and automatically performing the process by the controller according to the retrieved set of instructions;

automatically determining, with the controller, if a conflict exists with respect to the automatically controlled and performed process; and managing a determined conflicting process or conflicting parameter recommendation of the automatically controlled and performed process, with the controller, by identifying a risk of damage, failure, or sub-optimal performance of performed process as associated with at least one of the earth formation, a rig configuration, and the borehole, wherein performing the process includes automatically controlling parameters of the process according to the set of instructions.

11. The computer program product of claim 10, wherein performing the process includes displaying the set of instructions to a human operator as a set of actions to be performed by the operator.

12. The computer program product of claim 10, wherein the processing device is a host processing unit communicatively connected to a controller configured to control or monitor at least part of the process, and performing the process includes transmitting the set of instructions to the controller.

13. The computer program product of claim 12, wherein the host processing unit is communicatively connected to a plurality of different controllers and is configured to retrieve standard procedures for a plurality of types of energy industry processes.

14. The computer program product of claim 10, wherein the method further comprises, after retrieving the set of instructions, adjusting the set of instructions to customize the set of instructions to one or more parameters specific to the process.

15. The computer program product of claim 10, wherein the one or more sets of instructions includes at least one of: information describing parameters of a planned energy industry operation, and measurement data collected in real time during the energy industry operation.

16. The computer program product of claim 15, wherein the processing device is configured to identify a potentially detrimental condition that is occurring or impending during the energy industry operation, and retrieving the set of instructions includes automatically selecting a set of instructions best suited to address the condition and transmitting in real time the set of instructions to a user.

17. The computer program product of claim 10, wherein the process is to be performed repetitively during the energy industry operation.

18. The computer program product of claim 10, wherein the set of instructions includes a severity level value assigned thereto, and retrieving the set of instructions includes identifying at least two sets of instructions associated with different standard procedures applicable to the process, and determining which set of instructions has a higher priority based on the severity level.

* * * * *